United States Patent [19]

Jamon

[11] Patent Number: 4,508,196
[45] Date of Patent: Apr. 2, 1985

[54] WEAR AND LICKING ALARM FOR CROWN OR DISK BRAKE

[75] Inventor: Jacques Jamon, Cébazat, France

[73] Assignee: Compagnie Generale des Etablissements Michelin, Clermont-Ferrand, France

[21] Appl. No.: 455,304

[22] Filed: Jan. 3, 1983

[30] Foreign Application Priority Data

Jan. 18, 1982 [FR] France ................................ 82 00939

[51] Int. Cl.³ ...................... F16D 63/00; G01D 21/02; B60Q 1/00
[52] U.S. Cl. .................................. 188/1.11; 116/208; 340/52 A
[58] Field of Search .............. 188/1.11, 218 XL, 73.1; 340/52 A, 52 B; 192/30 W; 200/61.44; 116/208

[56] References Cited

U.S. PATENT DOCUMENTS

| | | |
|---|---|---|
| 3,716,113 | 2/1973 | Kobayashi et al. ................. 188/1.11 |
| 3,805,228 | 4/1974 | Peeples .............................. 340/52 A |
| 3,882,448 | 5/1975 | Shibatani et al. ................. 340/52 A |
| 3,887,899 | 6/1975 | Kawaguchi et al. .............. 188/1.11 |
| 3,958,445 | 5/1976 | Howard et al. .................... 188/1.11 |
| 4,188,613 | 2/1980 | Yang et al. ......................... 340/52 B |
| 4,298,857 | 11/1981 | Robins et al. ..................... 340/52 A |

FOREIGN PATENT DOCUMENTS 1530653  4/1969  Fed. Rep. of Germany .... 340/52 B

Primary Examiner—Bruce H. Stoner, Jr.
Assistant Examiner—Robert J. Oberleitner
Attorney, Agent, or Firm—Brumbaugh, Graves, Donohue & Raymond

[57] ABSTRACT

A first wear feeler arranged in a brake lining slides within a borehole under the pressure of a spring in the direction towards a crown or disk. The feeler is immobilized at the level corresponding to the maximum wear of the lining. A second borehole which extends from the maximum wear level to the friction surface of the lining contains a second, licking feeler connected electrically to the first feeler. A line to an alarm is provided with a switch which is open upon braking maneuvers and closed otherwise. The closing of the alarm circuit other than during braking maneuvers is produced either in the case of licking of the lining on the disk or on the crown by the second feeler or in the case of maximum wear by the first feeler.

8 Claims, 9 Drawing Figures

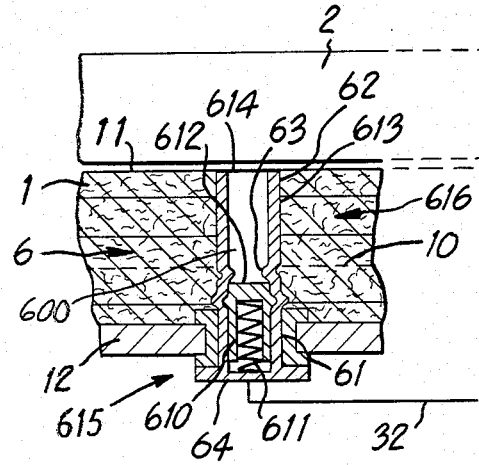
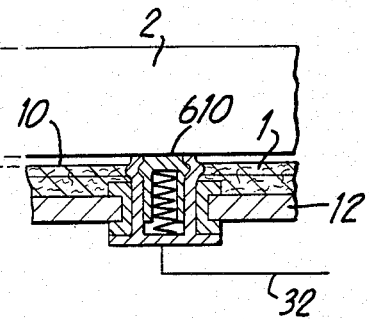
FIG. 2  FIG. 3
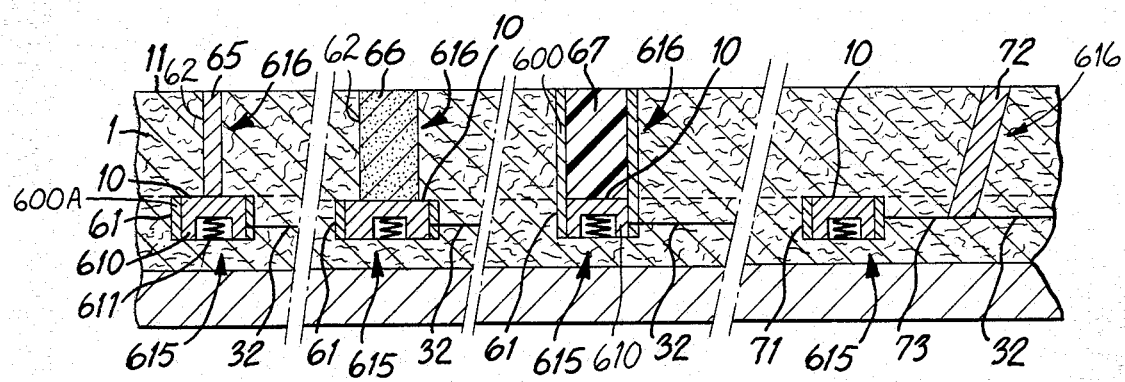
FIG. 4  FIG. 5  FIG. 6  FIG. 7
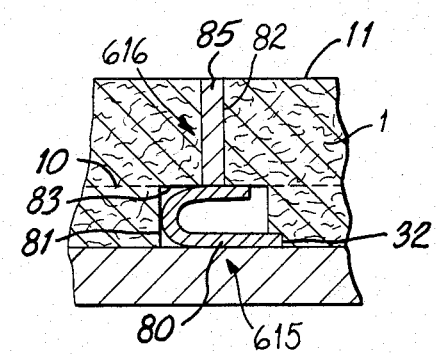
FIG. 8

WEAR AND LICKING ALARM FOR CROWN OR DISK BRAKE

The present invention relates to improvements in crown or disk brakes intended to brake a rotating assembly, for instance a vehicle wheel.

In this type of brake, a metal crown or disk is firmly attached to the rotating assembly which is to be braked. On opposite sides of the crown or disk, there is arranged at least one lining of a material of high coefficient of friction as compared with the material constituting the crown or disk. The braking maneuver consists in causing the linings to rub on the braking tracks of the crown or disk.

If it is desired to obtain an acceptable response time from this type of brake, it is necessary to allow the linings to rub slightly at all times on the braking tracks when braking maneuvers are not being effected. This rubbing, known as "licking", consumes a substantial amount of energy and may cause undesirable local wear of the crown or disk.

If, on the other hand, sufficient clearance is introduced between the linings and the braking tracks to avoid the licking of the linings, the response time of the brake is increased. This is the reason why anti-licking devices have recently been proposed which make it possible to introduce sufficient clearance in order to avoid licking and its drawbacks without however lengthening the response time of brakes of the type considered above.

The object of the invention is to provide an apparatus which monitors these anti-licking devices and signals an accidental licking due to misadjustment of such devices without however neutralizing the lining-wear alarm.

Thus the invention concerns a monitoring and alarm device for crown or disk brakes, which brakes have a metal crown or disk which is firmly attached to a rotating assembly, for instance a vehicle wheel, and on opposite sides of the crown or disk at least one lining having a friction surface of a material of high coefficient of friction intended to rub on the crown or disk, this device comprising a first electrically conductive feeler arranged in each brake lining with one end thereof intended to come into contact with the crown or disk at the level of maximum wear of the lining and with the other end connected by a line to one pole of an alarm circuit, the other pole of the alarm circuit being connected by another line to the crown or disk, characterized by the fact that the first feeler is contained in a first cavity in the lining and comprises a spring exerting its pressure in the direction towards the crown or disk;

by the fact that the end of the first feeler, which is intended to come into contact with the crown or disk at the level of maximum wear of the lining, is immobilized at said level;

by the fact that a second cavity, which extends from the level of maximum wear of the lining to the friction surface of the lining intended to rub against the crown or disk, contains a second electrically conductive feeler electrically connected to and superposed on the first feeler, the second feeler wearing down like the material of high coefficient of friction of the lining; and by the fact that the line connecting the first feeler to the alarm circuit is provided with a switch which is kept open upon each braking maneuver and is closed at times other than during the braking maneuvers.

The linings are customarily equipped with a small electrically conductive cylinder the base of which closest to the friction surface of the linings on the braking tracks of the crown or disk is located at the level contemplated for the maximum wear of the linings. The other base of the cylinder is connected to a flexible conductor which assures the electrical connection to the alarm device which indicates maximum wear of the brake linings. Upon braking maneuvers carried out with linings which have arrived at their maximum wear, the conductive cylinder touches the crown or disk and triggers the alarm. Apart from these braking maneuvers at maximum wear level, the alarm remains passive, even in the case of the licking of the linings.

The device in accordance with the invention, on the other hand, makes use of the wear alarm to give notice of the licking of the linings. It not only enters into operation as soon as there is licking, but also as soon as a lining has arrived at the maximum wear level, and does this at times other than during braking maneuvers.

The drawing shows and the part of the description relating thereto describes various illustrative embodiments of the invention.

In the drawing

FIG. 1 is a basic diagram of a monitoring and alarm device in accordance with the invention while

FIGS. 2 and 3 illustrate an embodiment of the assembly formed by the two feelers arranged—in accordance with the invention—within the brake lining, FIG. 2 showing the lining in new condition and FIG. 3 when the lining has reached the maximum level of wear; and FIGS. 4 to 8 show other embodiments of the assembly formed by the two superposed feelers installed in a lining in new condition.

It goes without saying, without the description indicating this expressly, that the different elements of the electrical circuits in accordance with the invention are insulated in suitable manner from each other, in particular in cases in which the linings are electrically conductive.

Figure 1:
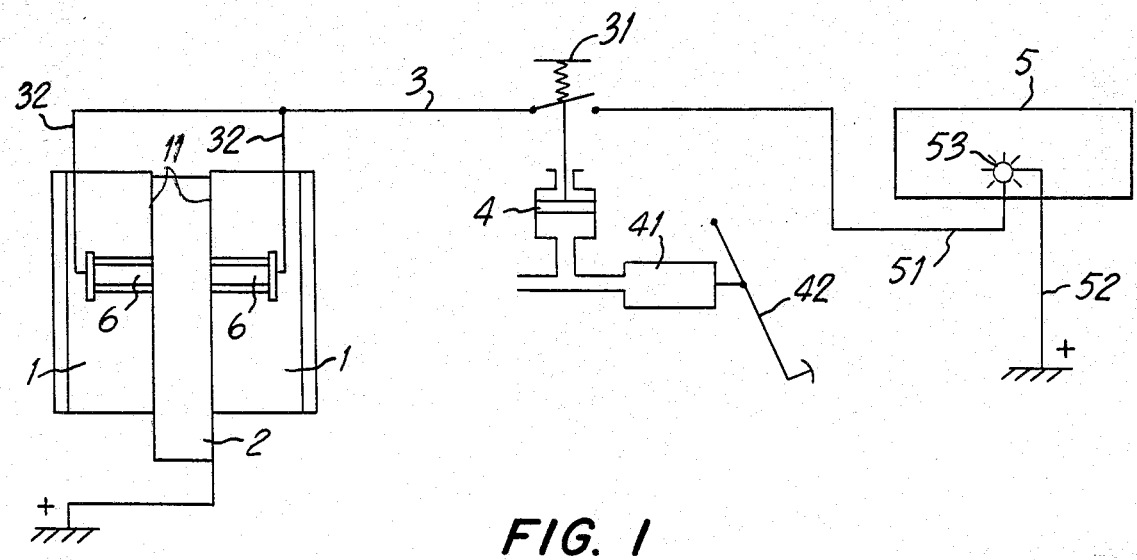

FIG. 1 shows a monitoring and alarm device in accordance with the invention during the course of a braking maneuver. This device comprises two linings 1 having a friction surface 11 of a material of high coefficient of friction which preferably is not electrically conductive, a metal brake crown or disk 2 (shown in part), an electric line 3 provided with a switch 31, a control 4 for this switch 31, and an alarm apparatus 5.

The linings 1 are arranged on opposite sides of and in contact with the metal crown or disk 2. In each lining 1 there is arranged an assembly 6 of two superposed feelers in accordance with the invention. The detailed structure of embodiments of such feelers is described below in connection with FIGS. 2 to 8. One end of the assembly 6 of superposed feelers is located flush with the friction surface 11 of the linings 1 in contact with the crown or disk 2 along the corresponding braking track. The other end of the assembly 6 is embedded in the lining 1. An electric conductor 32 connects each superposed assembly 6 to the line 3 leading to one of the poles 51 of the alarm device 5.

The switch 31 which is arranged in the line 3 is opened due to the control device 4, for instance a pressure contact connected to the master cylinder 41 actuated by the brake pedal 42 in the case of an automotive vehicle. The other pole 52 of the alarm device 5 as well as the metal crown or disk 2 are connected to ground.

Between the two poles 51, 52 of the alarm 5 there are connected a source of electricity (not shown) and a device intended to attract the attention of the driver, for instance a bulb 53 or an acoustic apparatus. This connection is effected in such a manner that the bulb 53 lights up (or that the acoustic apparatus gives off an audible sound) when the circuit formed by the crown or disk 2, the assembly 6 of superposed feelers of the lining 1, the conductors 32 connecting the assembly 6 of superposed feelers to the line 3, the line 3 itself and the alarm device 5 is closed. This cannot take place during braking maneuvers since in such case the switch 31 is opened in accordance with the invention even though one or the other assembly 6 of superposed feelers is in contact with the corresponding braking track of the crown or disk 2. When braking maneuvers are not being carried out, the switch 31, on the other hand, is closed in accordance with the invention. The above circuit therefore can itself be closed only if at least one of the assemblies 6 of superposed feelers of a lining 1 is in contact with the crown or disk 2, that is to say when a lining 1 at least licks the crown or disk 2. Thus the alarm signals that the antilicking system is out of adjustment.

In FIG. 2, the lining 1 (shown in part), which is in new condition, is arranged with clearance 20 opposite the brake crown or disk 2 (shown in part).

The assembly 6 of the two superposed feelers 615, 616 in accordance with the invention which is shown in FIG. 2 and FIG. 3 corresponds to a first preferred embodiment of the invention. In this embodiment, the two cavities of the lining 1 are cylindrical boreholes 61, 62 and have a common axis. In the second variant, shown in FIG. 7, the two boreholes 71, 72 have separate axes, the essential factor being that between the two superposed feelers there is a conductor 73 which electrically connects the first feeler to the second as well as a second conductor 32 connecting the assembly 6 to the line 3 leading from the assembly 6 of feelers to the alarm 5.

In FIG. 2 a single electrically conductive tube 600 extends through the first and second boreholes 61, 62 and is fastened in the lining 1 and its support 12 by known means. At the level 10 which corresponds to the maximum wear of the lining 1, the tube 600 has an inner rib 63 marking the separation between the first borehole 61 and the second borehole 62. On the side opposite the crown or disk 2, the first borehole 61 is closed by a bottom 64 of the electrically conductive tube 600. The conductor 32 connecting the assembly 6 of the superposed feelers to the line 3 extending to the alarm 5 is fastened to said bottom 64.

The first borehole 61 contains a feeler 615 which is formed of a cylinder 610 and a spring 611, both of them being electrically conductive. By pressing against the bottom 64 of the tube 600, the conductive spring 611 causes the feeler cylinder 610 to slide in the borehole 61 in the direction towards the crown or disk 2. The inner rib 63 in the tube 600 in the manner of a stop immobilizes the end 612 of the feeler 615, that is to say of the cylinder 610, intended to come into contact with the brake crown or disk 2, at the level 10 of maximum wear of the lining.

The portion of the tube 600 contained between the inner rib 63 and the friction surface 11 of the lining 1 which is intended to rub against the crown or disk 2 in this example forms the second feeler 616 in accordance with the invention if one uses a tube 600 of a material which is worn by rubbing and is electrically conductive. The second feeler 616 is thus formed by the wall 613 of the tube 600 contained between the inner stop-rib 63 and the end 614 of the tube 600 flush with the friction surface 11 of the lining 1.

When, apart from the braking maneuvers, the lining 1 licks the crown or disk 2 and the switch 31 is closed, the alarm 5 is placed under voltage and the bulb 53 lights up. The alarm 5 serves as licking alarm as long as the lining 1 (FIG. 3) has not been worn down to its level of maximum wear 10. At this level of maximum wear 10, the inner stop-rib 63 of the wearable tube 600 is also worn. The conductive cylinder 610 of the first feeler 615, housed in the first borehole 61, is thus free to rub against the crown or disk 2 under the pressure of the spring 611, whatever the anti-licking clearance provided between the lining 1 and the crown or disk 2. The alarm 5 is placed under voltage and the bulb 53 is lit permanently except during braking maneuvers. The alarm 5 then operates as braking lining wear alarm. Thus the same alarm 5 serves, in accordance with the invention, as licking alarm and then as brake-lining wear alarm.

In the assemblies of two superposed feelers in accordance with the invention shown in FIGS. 4 and 5, the two cylindrical boreholes 61, 62 are co-axial, but their diameters are different. The borehole 61 of the first feeler 615, which extends up to the maximum wear level 10 of the lining 1, has a larger diameter than the borehole 62 which extends from the maximum wear level 10 to the friction surface 11 of the lining 1. The first feeler 615 in accordance with the invention which slides within the borehole 61 is formed, in the same manner as that of FIGS. 2 and 3, by a metal cylinder 610 which is pushed by a conductive spring 611 resting against the metal bottom 64 (not shown) of a tube 600A. The borehole 61 contains the metal tube 600A which is connected by the connecting conductor 32 to the line 3 controlling the alarm 5. The second borehole 62 is filled with an electrically conductive material, for instance a metal 65 (FIG. 4) or graphite 66 (FIG. 5), which is compatible with the braking track and does not melt at the temperatures reached upon the braking operations. The filling 65, 66 constitutes the second feeler 616. Since the second borehole 62 has a diameter smaller than that of the first borehole 61, the first feeler 615 is immobilized at the level of maximum wear 10 of the lining 1 in accordance with the invention until the lining 1 is worn to this level 10. The diameter of the second borehole 62 may also be larger than the diameter of the first borehole 61. In such case (not shown in the drawing), the conductive filling 65, 66 itself immobilizes the first feeler 615 at suitable level in its borehole 61.

In the variant shown in FIG. 6, the second feeler 616 according to the invention is formed by the same metal tube 600. The conductor 32 which connects to the control line 3 of the alarm 5 is fastened to the metal tube 600. The portion of the tube 600 above the maximum wear level 10 of the lining 1 is filled by a plug 67, for instance of plastic.

The variant shown in FIG. 7 differs essentially from the preceding variants by the non-concordance of the axes of the boreholes 71, 72 in accordance with the invention. A conductor 73 arranged below the level of maximum wear 10 of the lining 1 with respect to the friction surface 11 of the lining 1 connects the first feeler 615 to the second feeler 616.

In the four variants shown in FIGS. 4 to 7, a conductor 32 connects the first feeler 615 to the control line 3 of the alarm 5. While in the three variants of FIGS. 4 to 6, the wear of the second feeler 616 causes the expansion of the first feeler 615 under the action of its spring 611, the wear to the maximum level 10 of the lining 1 itself causes the expansion of the first feeler 615 in the case of FIG. 7, and then the operation of the alarm 5 as wear alarm. In the variant of FIG. 7 not only are the axes of the boreholes 71, 72 different from each other but the axis of the second borehole 72 is inclined with respect to the normal to the friction surface 11 of the lining 1. The axis of the first borehole 71 which contains the first expandable feeler 615 is preferably perpendicular to the friction surface 11 of the lining 1.

Figure 1A:
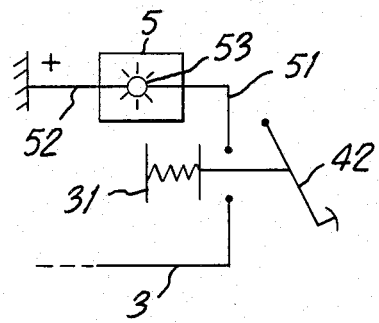
FIG. 1A is a variant of the control portion thereof.

FIG. 1A also shows a variant of the control for the opening of the switch 31 placed in the control line 3 of the alarm 5, at the same time as a variant embodiment of the alarm 5. In this variant, the switch 31 is opened directly by the movement of the brake pedal 42 upon a braking maneuver. The return spring for the brake pedal 42 returns the switch 31 to closed position when the braking maneuver is completed.

The variant shown in FIG. 8 differs from the other variants by the fact that the first feeler 615 is formed by an elastic metal ribbon 80 which is a conductor of electricity and bent into U shape. This U-shaped spring 80 is immobilized in the first cavity 81 at the level 10 corresponding to the maximum wear of the lining 1 and exerts its pressure in the direction towards the friction surface 11 of the lining 1. The immobilizing under compression of the spring 80 is effected by juxtaposing—in accordance with the invention—with the first cavity 81 a second cavity or a cylindrical borehole 82 filled with a metal 85 constituting the second feeler 616, which second cavity or borehole 82 is of a smaller diameter than the extension of the first cavity 81. In this way a shoulder 83 is formed which coincides with the level of maximum wear 10. The elasticity of the compressed spring 80 presses the spring 80 against this shoulder 83 and the second feeler 616. The conductor 32 which extends from the imbedded base of the first feeler 615 makes it possible to connect the two feelers 615, 616 to the alarm 5.

What is claimed is:

1. A monitoring and alarm device for crown or disk brakes, which brakes have a metal crown or disk which is firmly attached to a rotating assembly, for instance a vehicle wheel, and on opposite sides of the crown or disk at least one lining having a friction surface of a material of high coefficient of friction intended to rub on the crown or disk, this device comprising a first electrically conductive feeler arranged in each brake lining with one end thereof intended to come into contact with the crown or disk at a level of maximum wear of the lining and with an other end connected by a line to one pole of an alarm circuit, characterized by the fact that the first feeler is contained in a first cavity in the lining and comprises a spring exerting its pressure in the direction towards the crown or disk;

by the fact that the end of the first feeler, which is intended to come into contact with the crown or disk at the level of maximum wear of the lining, is immobilized at said level;

by the fact that a second cavity, which extends from the level of maximum wear of the lining to the friction surface of the lining intended to rub against the crown or disk, contains a second electrically conductive feeler electrically connected to and superposed on the first feeler, the second feeler wearing down like the material of high coefficient of friction of the lining; and by the fact that the line connecting the first feeler to the alarm circuit is provided with a switch which is kept open upon each braking maneuver and is closed at times other than during the braking maneuvers.

2. A device according to claim 1, characterized by the fact that a single electrically conductive tube extends through the first and second cavities; and by the fact that the first cavity is separated from the second by a rib on the inside of the tube located at the level of maximum wear of the lining, said tube and the cavities being preferably cylindrical.

3. A device according to claim 1, characterized by the fact that the spring of the first feeler consists of an electrically conductive material and forms the first feeler.

4. A device according to claim 2, characterized by the fact that the first feeler is formed by a cylinder and a spring, both of which are conductive, the spring resting against a bottom of said conductive tube.

5. A device according to claim 1, characterized by the fact that the two cavities are co-axial, cylindrical boreholes which are of different diameter; and by the fact that the second feeler maintains the first feeler at the level of maximum wear of the lining.

6. A device according to claim 1, characterized by the fact that the two cavities are cylindrical boreholes of the same diameter, and by the fact that the second feeler maintains the first feeler at the level of maximum wear of the lining.

7. A device according to claim 1, characterized by the fact that the two cavities are cylindrical boreholes of different axes; and by the fact that the two feelers are connected by a conductor arranged below the level of maximum wear of the lining with respect to the friction surface of the lining.

8. A device according to claim 1, characterized by the fact that the first cavity is a cylindrical borehole whose axis is perpendicular to the friction surface of the lining.

* * * * *